US008368750B2

(12) United States Patent
Mori et al.

(10) Patent No.: US 8,368,750 B2
(45) Date of Patent: Feb. 5, 2013

(54) NON-UNIFORMITY EVALUATION APPARATUS, NON-UNIFORMITY EVALUATION METHOD, AND DISPLAY INSPECTION APPARATUS AND PROGRAM

(75) Inventors: Yumi Mori, Shimotsuruma (JP); Hiroki Nakano, Nakagyou-Ku (JP)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 12/643,017

(22) Filed: Dec. 21, 2009

(65) Prior Publication Data
US 2010/0157044 A1 Jun. 24, 2010

(30) Foreign Application Priority Data

Dec. 24, 2008 (JP) ................ 2008-328140

(51) Int. Cl.
*H04N 7/18* (2006.01)
*H04N 9/47* (2006.01)
(52) U.S. Cl. ............... 348/92; 348/55; 348/42
(58) Field of Classification Search ............... 348/92, 348/58, 42
See application file for complete search history.

(56) References Cited

U.S. PATENT DOCUMENTS

| | | | | |
|---|---|---|---|---|
| 5,917,935 A * | 6/1999 | Hawthorne et al. | ............ | 382/149 |
| 6,154,561 A * | 11/2000 | Pratt et al. | ............ | 382/141 |
| 6,344,837 B1 * | 2/2002 | Gelsey | ............ | 345/6 |
| 6,806,903 B1 * | 10/2004 | Okisu et al. | ............ | 348/254 |
| 7,525,641 B2 * | 4/2009 | Zimmerman et al. | ............ | 355/69 |
| 7,922,921 B2 * | 4/2011 | Chuang et al. | ............ | 216/23 |
| 2001/0024231 A1 * | 9/2001 | Nakamura et al. | ............ | 348/58 |
| 2006/0214904 A1 * | 9/2006 | Kimura et al. | ............ | 345/102 |
| 2007/0174355 A1 | 7/2007 | Woo et al. | | |
| 2008/0204741 A1 * | 8/2008 | Hill et al. | ............ | 356/239.7 |
| 2009/0027575 A1 * | 1/2009 | Miyauchi et al. | ............ | 349/5 |

FOREIGN PATENT DOCUMENTS

| | | |
|---|---|---|
| JP | 62123538 U | 8/1987 |
| JP | 03254159 | 5/1990 |
| JP | 06060172 A2 | 3/1994 |
| JP | 7084839 A1 | 3/1995 |
| JP | 2001281096 A | 10/2001 |
| JP | 2002188956 A | 7/2002 |
| JP | 2003066398 A | 3/2003 |
| JP | 200400018 A | 1/2004 |
| JP | 2007093304 A | 4/2007 |
| JP | 2008014635 A | 1/2008 |
| JP | 2008267828 A | 11/2008 |

OTHER PUBLICATIONS

Mori, Quantitative Evaluation Method of Liquid Crystal Display's mura (luminance Nonuniformity) by using Wavelet Transform, E&TS, IBM Japan, IIS05020 (Nov. 25, 2005).

* cited by examiner

*Primary Examiner* — Joseph Ustaris
*Assistant Examiner* — Anner Holder
(74) *Attorney, Agent, or Firm* — Michael J. LeStrange

(57) ABSTRACT

A mura evaluation apparatus 100 includes: a mura detection unit 110 that acquires multiple images of a display mura present in a display area of a display device by scanning the display area while moving along a spherical surface with a preset radius; and an information processing apparatus 150 that generates a three-dimensional mura figure from the multiple images acquired by the mura detection unit, by associating a feature value of the display mura in each of the images with a position where the image is acquired, and generates a mura superimposed image in which the three-dimensional mura figure viewed from a designated observation angle is superimposed.

11 Claims, 10 Drawing Sheets

PERSPECTIVE→PLANE
AFFIN CONVERSION

WHEN VIEWED IN
VERTICAL (NORMAL)
DIRECTION

WHEN VIEWED FROM
ANGLE (20, 30)

WHEN VIEWED FROM
ANGLE (45, 45)

NON-UNIFORMITY EVALUATION APPARATUS, NON-UNIFORMITY EVALUATION METHOD, AND DISPLAY INSPECTION APPARATUS AND PROGRAM

BACKGROUND OF THE INVENTION

The present invention relates to an evaluation of a flat panel display, more specifically, relates to a technique for evaluating a non-uniformity on a flat panel display with consideration for an observation angle with respect to the display.

A display device referred to as a so-called flat panel display such as a liquid crystal display, an organic electroluminescent display, and a plasma display is required to provide uniform display all over the display screen. Since display devices are affected by manufacturing variations in quality of each component, not all of the display devices are capable of providing uniform display properties in the whole range of the display area. For this reason, in a display device inspection, display devices are made to operate and are inspected to find out whether or not display non-uniformity (hereinafter also called mura or a mura defect) occurs in their display areas.

FIG. 10 shows mura (non-uniformity) detection images generated by a conventionally known mura evaluation method. As shown in FIG. 10, four mura defects are observed in the display area of a display device. Each mura defect is marked with an evaluated value indicating a degree of mura defect. Here, the higher the evaluated value, the more noticeable the mura defect.

In the conventional method, mura defects are detected by changing an inspection angle, as shown in FIG. 10. When a mura defect is detected from different angles, the mura defect is determined as having different evaluated values indicating the degrees of mura at the respective angles, and as having an area with different shapes and sizes. The conventional method, however, has a problem that a mura distribution in each observation direction cannot be intuitively determined. Moreover, because the mura defects in the observation direction cannot be intuitively determined, the conventional method further has problems that the conventional method fails to provide an evaluation result equivalent to that in a sensory test, and to make information on a mura distribution inside each mura defect available for effective use.

Various kinds of methods have been heretofore proposed for mura evaluation of a display device. For example, Japanese Patent Application Publication No. 2008-64629 discloses a method including: capturing images of a display, which is to be inspected, under a condition at multiple levels; acquiring multiple first images from the image-capturing results; generating multiple second images by processing these first images so that a change in each of the first images can be emphasized; generating a composite image by synthesizing these second images with predetermined weights assigned to the second images; and determining the presence of a mura defect on the basis of the composite image. In JP-A 2008-64629, the assigned weights are determined by using multiple second images generated from a display for reference having a mura defect. More specifically, the weights are determined so that an area having the mura defect can be identified distinctively from the other area in a composite image generated by synthesizing the second images of the display for reference.

Japanese Patent Application Publication No. 2007-174355 discloses an evaluation apparatus that evaluates a display by excluding a luminance change along with a change in an observation (visual) angle. This evaluation apparatus includes: an image capture that captures multiple images of respective parts of a display at different imaging positions; means for performing interpolation computation on the image information of the imaged parts of the display whose images are captured at the respective imaging positions by the image capture; and means for generating an luminance image showing the luminance of the display measured in a certain direction and for quantifying mura from the luminance image.

Japanese Patent Application Publication No. 2007-93466 discloses an evaluation assisting apparatus for an evaluation of a color image display device including a screen in which pixels are arranged in a two dimensional array, the pixels each providing a display color that is viewed as different colors in different observation directions. This evaluation assisting apparatus evaluates color reproduction properties of the color image display device when the observation angle is changed, in a method including: figuring out an observation direction of each of the pixels when the screen displaying a color image for evaluation is viewed from a first position; figuring out the viewed color of the color image when the pixel is viewed in the figured-out observation direction from the first position; figuring out an observation direction of each of the pixels when the screen displaying the color image is viewed from a second position; figuring out the viewed color of the color image when the pixel is viewed in the figured-out observation direction from the second position; obtaining a color difference between the viewed colors of each of the pixels figured out when the screen is viewed from the first and second positions, respectively; and calculating an evaluated value of the display device from the color difference of each of the pixels.

Meanwhile, as a method of detecting mura in a display area of a display device, a method of automating a sensory inspection for measuring display mura of a display device is also disclosed by the present inventors in Nakano and Mori, "Quantitative Approach of Sensory Evaluation By Using Machine Vision Technique," Journal of the Institute of Electrical Engineers of Japan, Vol. 125, No. 11, pp. 696-698 (2005).

In addition, a method of qualitatively measuring mura by using an SEMU method and correcting the mura through a wavelet transform is disclosed in Mori and Nakano, "Quantitative evaluation method of liquid crystal displays' mura (luminance nonuniformity) by using wavelet transform," Papers of Technical Meeting on Information Oriented Industrial System, Vol. IIS-05; No. 11-20, (D) Industry Applications, The Institute of Electrical Engineers of Japan.

In the method described in JP-A 2008-64629, multiple first images are captured by changing the shooting angle or the like; second images having their contrasts changed from those of the first images are generated from the first images, and then are synthesized to generate a composite image; and then whether or not a mura defect is present is determined based on the generated composite image. Thus, JP-A 2008-64629 discloses the method in which a result similar to a result of a sensory test conducted by an inspector is generated using the multiple images captured at the different angles. This method, however, only allows a determination as to the presence of mura by performing image processing on images captured at different angles and then synthesizing the images. In other words, even with use of this method, the angular distribution and size of mura cannot be determined through evaluation.

In JP-A 2007-174355, the display colors of the display device are observed to detect how each of the display colors is changed in color tone depending on the observation direction, and thereby mura is evaluated as the distribution of color reproducibility at the observation angle. The use of this method allows mura to be evaluated from the viewpoint of hue change that is one of compound factors for generating mura. However, a mura defect also occurs depending on the luminance distribution as well as the hue distribution. For this reason, even with use of the method of JP-A 2007-174355, it is not possible to evaluate how a mura defect of a display device is changed in absolute size depending on the observation angle.

Moreover, the method of JP-A 2007-93466 is also only to synthesize first images to generate a second image for the purpose of evaluating mura in the color reproduction properties. In the generation of the second image, the first images are weighted depending on their shooting angles. In this way, the method of JP-A 2007-93466 is not a method of providing values equivalent to the values resulting from a sensory test (organoleptic test), to evaluate how a mura defect is changed in absolute size along with a change of the observation angle, and to evaluate the absolute size of the mura defect.

As described above, mura of a display device is changed in luminance and color tone along with a change in the observation angle. When image processing such as image synthesis is performed to evaluate the mura thus changed, information on a range where the mura occurs or other similar information may be obtained from the synthesized image. Such method, however, can neither quantify mura itself with consideration for the observation angle so that the quantification result of the mura can indicate a physiological intensity in a recognizable manner equivalent to that of a sensory test, nor display the quantification result as if the result of the sensory test is displayed.

Mura of display devices is considered important as one of quality requirements common to panel production sites, makers and users. In addition, the range of viewing angle is also considered important as one of display quality requirements. For this reason, in terms of quality control and for the purpose of improvement of inspection efficiency, quantitative measurement of mura has been demanded to obtain an indicator, equivalent to that of the sensory test, indicating how mura exists in the display area within the range of the viewing angle to be supported by a display device, and how the mura looks depending on the observation angle.

In summary, there has been heretofore demanded a technique that allows mura in the display area of a flat panel display device to be graphically displayed and to be intuitively determined by quantifying, as an indicator equivalent to a result of a sensory test, the presence of the mura and the intensity of the mura on the human vision that even changes depending on the observation angle.

SUMMARY OF THE INVENTION

According to the present invention, an image of a display area of a display device set within a field of view of a camera is captured in order to evaluate display mura of the display device. Display mura targeted for three-dimensional mura figure data generation are extracted from the display mura present in the captured image of the display area. Images of each of the extracted display mura are captured at different elevation angles and azimuth angles with respect to the camera. Then, a feature value of the display mura for each position is calculated, and the three-dimensional mura figure data is generated by use of the positions related to the observation directions and the feature values of the display mura.

According to the present invention, a three-dimensional mura figure curved plane can be generated based on the generated three-dimensional mura figure data. Here, the three-dimensional mura figure curved plane smoothly connects the three-dimensional mura figure data or gives a minimum residual. In addition, according to the present invention, a mura superimposed image is generated and displayed by using the three-dimensional mura figure data of a display mura detected in the display area in the following way: firstly, a shape of the three-dimensional mura figure curved plane, i.e., the position coordinates thereof in a display space, viewed from the observation angle with respect to the display area is calculated; and then, the three-dimensional mura figure curved plane viewed from the observation angle is superimposed on a virtual plane representing the display area viewed from the observation angle.

Moreover, in the present invention, a region having a feature value equal to or higher than a threshold set for the display mura is superimposed, as a potion different in hue or luminance, on the three-dimensional mura figure curved plane at a position in a bottom surface of the three-dimensional mura figure. Thereby, the visual anisotropy of the display mura can be displayed.

Additionally, in the present invention, a handle for rotating a virtual plane representing the display area is defined in the virtual plane. The virtual plane is rotated in response to an operation performed on the handle by an operator. At this time, the three-dimensional mura figure curved plane is recalculated to obtain the curved plane that is to be displayed by a display device included in the information processing apparatus when the three-dimensional mura figure is viewed from the observation angle according to the rotation angle of the virtual plane. By use of the recalculated curved plane, the mura superimposed image can be updated.

According to the present invention, provided are a mura evaluation apparatus, a mura evaluation method, and a display inspection apparatus and program which are capable of quantifying a display mura of a display device to provide an indicator equivalent to that of a sensory test, so that mura evaluation can be made from the viewpoints of how mura exist in a display area within a range of viewing angle to be supported by a display device, to what extent the mura look at different observation angles, and how anisotropic the mura are.

BRIEF DESCRIPTION OF THE DRAWINGS

For a more complete understanding of the present invention and the advantage thereof, reference is now made to the following description taken in conjunction with the accompanying drawings.

DETAILED DESCRIPTION OF THE PREFERRED EMBODIMENTS

Figure 1:
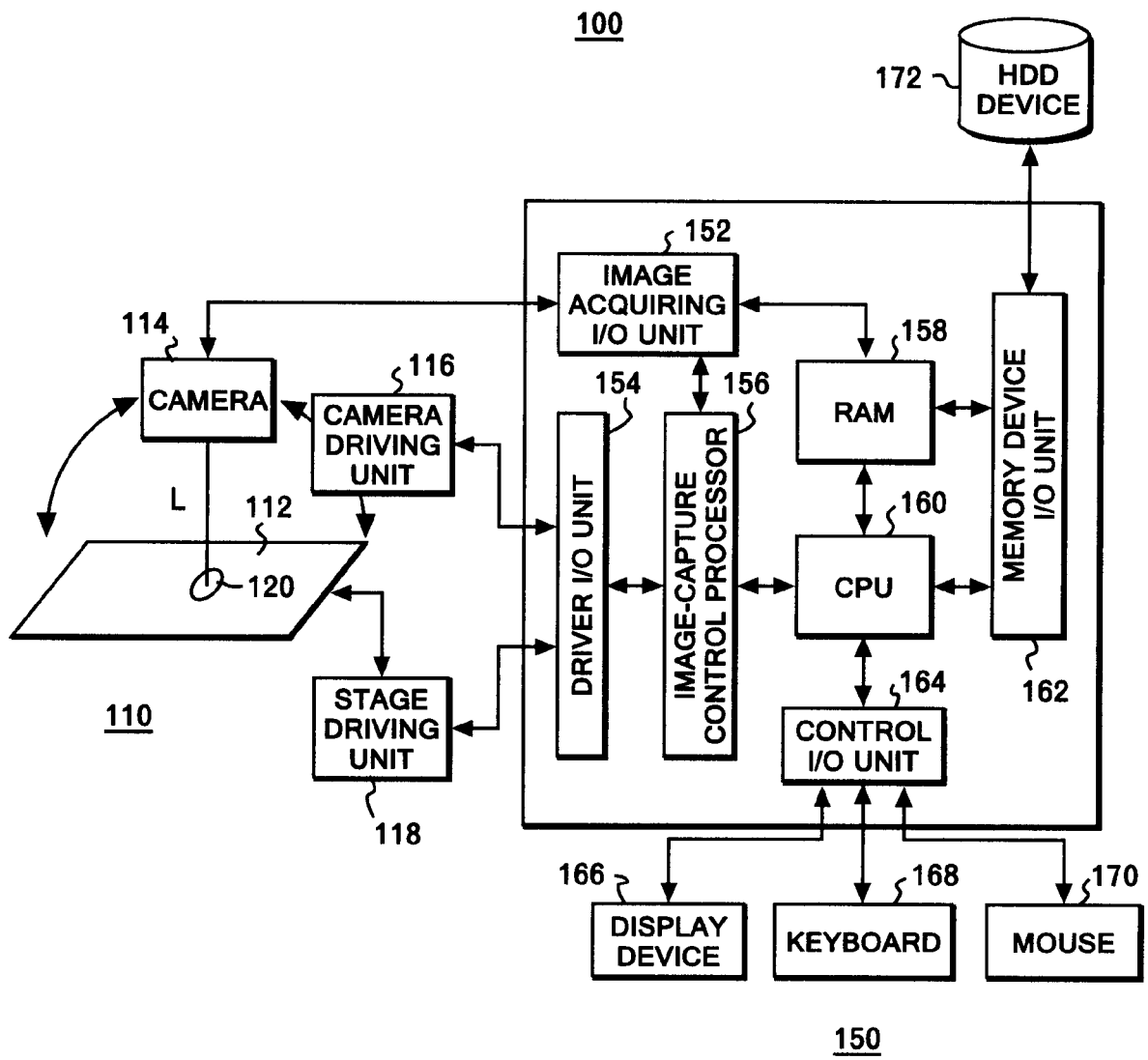
FIG. 1 is a diagram showing an example of a mura evaluation apparatus 100 according to an embodiment.

Hereinafter, the present invention will be described based on embodiments, though the present invention is not limited to the embodiments described below. FIG. 1 shows an example of a mura evaluation apparatus 100 of this embodiment. The mura evaluation apparatus 100 is provided as a display inspection apparatus for so-called flat display devices for displaying images, such as a liquid crystal display device, a plasma display device and an organic EL display device. The mura evaluation apparatus 100 includes a mura detection unit 110 and an information processing apparatus 150 for evaluating detected mura.

The detection unit 110 includes a stage 112, a camera 114 and a camera driving unit 116 for moving the camera 114. The stage 112 is configured to be movable in a plane direction relative to the camera 114 by a stage driving unit. More specifically, with a display device placed thereon, the stage 112 is moved so that a particular point in the display area of the display device is positioned in the center of a field of view of the camera 114.

In addition, the camera driving unit 116 moves the camera 114 along a spherical surface with radius L having the center placed on the particular point in the display area. Thereby, the camera 114 captures images of a mura defect 120 related to the particular point while changing an elevation angle ($\beta$) and an azimuth angle ($\alpha$), and thus acquires as the images a change in the mura defect viewed from different angles. For this purpose, the camera driving unit 116 includes a mechanism such as a robot arm (not illustrated) for moving the camera 114 relative to the display area, i.e., along the spherical surface with radius L, or a spherical surface dome (not illustrated) for moving the camera 114 along the spherical surface with radius L while accommodating the stage 112 therein. The camera driving unit 116 moves the camera 114 along the spherical surface with radius L about the center of the mura defect 120. Here, in this embodiment, the term "mura" indicates a display non-uniformity on an image display including a non-uniformity in luminance, hue and tone.

The camera driving unit 116 and the stage driving unit 118 move the camera 114 and the display device, respectively, by use of a stepping motor, a robot arm or the like. The operations of the camera driving unit 116 and the stage driving unit 118 are controlled by an information processing apparatus 150 through an interface such as a general purpose interface bus (GPIB), for example. The camera driving unit 116 and the stage driving unit 118 move the camera 114 and the display device, respectively, in response to an instruction from an operator, or in accordance with the execution of an evaluation program implemented in the information processing apparatus 150. In this way, images of the mura defect 120 are captured.

Together with information on the shooting positions ($\alpha$, $\beta$), the images captured by the camera 114 are transmitted to the information processing apparatus 150, and stored as data for evaluation processing. Here, an observation angle is defined by the position ($\alpha$, $\beta$), where the angle $\alpha$ is an azimuth angle with respect to a reference direction defined on a plane in the display area (the angle $\alpha$ increases in the counterclockwise direction), and the angle $\beta$ is an elevation angle at which the camera is viewed from the center of a mura. In this embodiment, the angle with respect to the plane of the display area of the display device is defined as 0° to 180° in the counterclockwise direction on the plane shown in FIG. 1. A shooting angle is controlled with respect to the normal direction (=0) to the display area of the display device, and is defined as ($-\theta$) when inclined on the left-hand side in FIG. 1, and as ($+\theta$) when inclined on the right-hand side in FIG. 1. The elevation angle $\beta$ corresponds to the shooting angle, and is defined as 0° when the direction formed with the elevation angle $\beta$ is perpendicular to the display area (in the normal direction of the display area) and as 90° when the direction is parallel to the display area.

The information processing apparatus 150 is provided as a personal computer or a work station. Although the configuration of the information processing apparatus 150 is not described in detail herein because it is not a key point in this embodiment, the information processing apparatus 150 is provided with a central processing unit (CPU) 160 and a RAM 158. The CPU 160 is not limited to a particular one, and may include any type of known processor such as a single-core processor or a multi-core processor. The RAM 158 is provided as a memory device, and provides an execution space on which the CPU 160 executes programs. The CPU 160 loads an operating system (OS) to the RAM 158 and executes the evaluation program of this embodiment under the control of the OS to generate the evaluation result.

The OS is not limited to a particular one, but may be any type of known OS such as WINDOWS (registered trademark), UNIX (registered trademark), LINUX (registered trademark), and MAC OS (registered trademark). In addition, the information processing apparatus 150 may be equipped with browser software such as Internet Explorer (registered trademark), FireFox (registered trademark) and Opera (registered trademark), and can access a web server through a network.

The information processing apparatus 150 includes an image-capture control processor 156, an image acquiring I/O unit 152 and a driver I/O unit 154. The image acquiring I/O unit 152 receives images captured by the camera 114 and stores the images in the RAM 158. The driver I/O unit 154 transmits drive control signals to the camera driving unit 116 and the stage driving unit 118, and thereby controls the operations of these driving units 116 and 118. The image acquiring I/O unit 152 and the driver I/O unit 154 generates the drive control signals for the camera driving unit 116 and the stage driving unit 118 in response to instructions from the image-capture control processor 156, and transmits the drive control signals to these two driving units 116 and 118.

The image-capture control processor 156 receives instructions from the CPU 160, and transmits, to each of the I/O units, instructions to generate the drive control signal for controlling the movements of the camera driving unit 116 and the stage driving unit 118. Moreover, the image-capture control processor 156 controls the image acquiring I/O unit 152 so that the images captured by the camera 112 can be stored in the RAM 158.

The information processing apparatus 150 further includes a control I/O unit 164 and a memory device I/O unit 162. The control I/O unit 164 detects an event of any of various kinds of instructions inputted by an operator through an input device such as a keyboard 168 or a mouse 170, issues an instruction to the CPU 160, and causes the CPU 160 to start the execution of the evaluation program. In addition, the control I/O unit 164 generates an event for prompting the operator to give an instruction to the CPU 160. Moreover, the control I/O unit 164 causes a display device 166 to display a graphical user interface (GUI) for allowing the operator to check a processing result of the information processing apparatus 150. Here, the display device 166 is provided as a liquid crystal display, a plasma display, or the like. The control I/O unit 164 may be configured to generate a GUI for displaying a processing result of the mura evaluation by the CPU 160, to cause the display device 166 to display the GUI thereon, and to provide a hardcopy of the GUI through a page printer (not illustrated).

The information processing apparatus 150 also includes the memory device I/O unit 162, and stores image data and position data, which are transiently stored in the RAM 158, in a nonvolatile memory device 172 such as an HDD device 172. The memory device I/O unit 162 is not particularly limited and may be any unit as long as the unit can transfer data between the information processing apparatus 150 and the HDD device 172 by using standards such as SCSI, Ultra SCSI, ATA, ATAPI, Serial ATA, or Ultra DMA.

Figure 2:
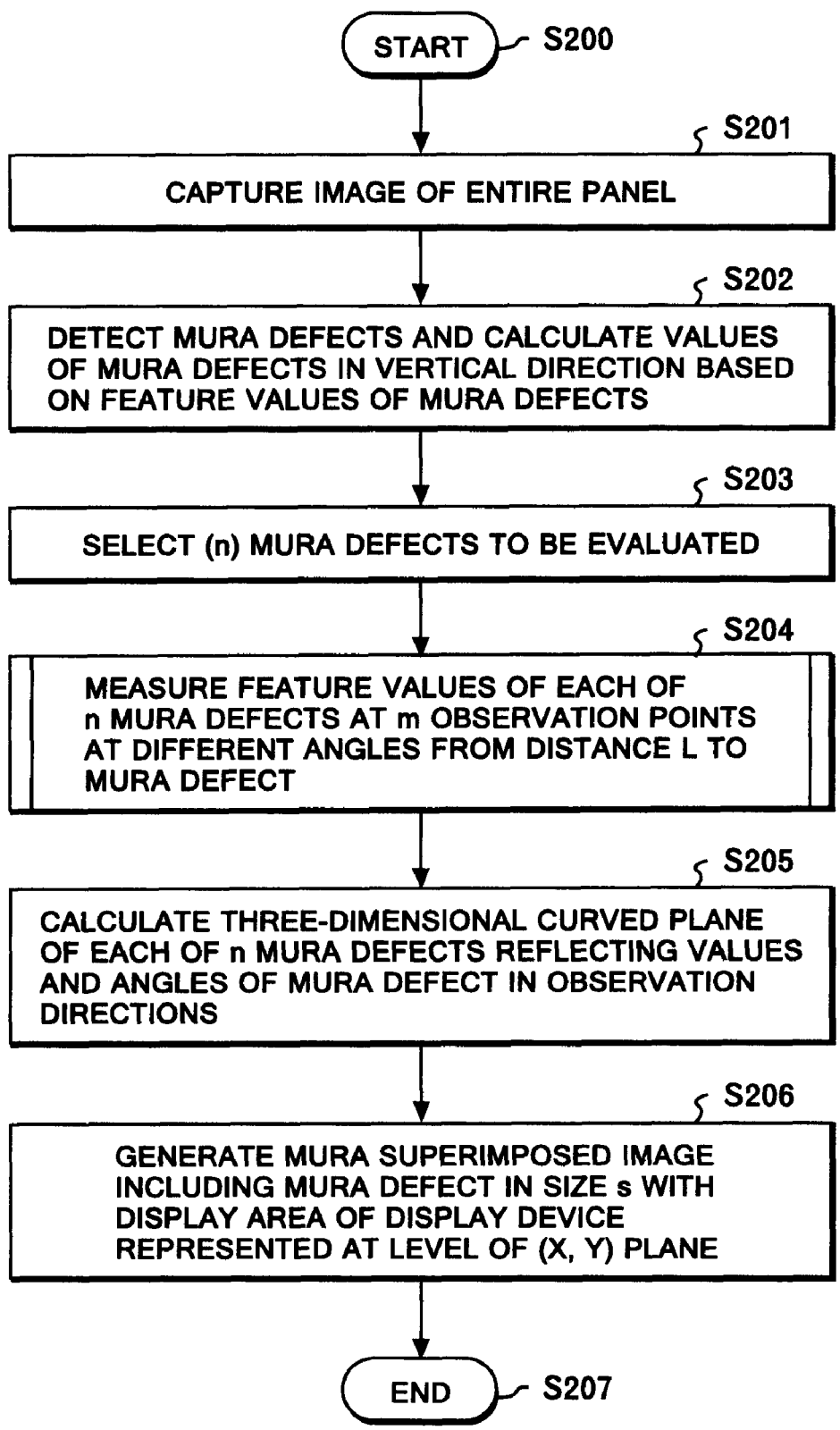
FIG. 2 shows a flowchart of a mura evaluation method according to this embodiment.

FIG. 2 shows a flowchart of a mura evaluation method of this embodiment. In the processing steps shown in FIG. 2, processing steps in steps S202 to S206 are executed by causing the information processing apparatus 150 to serve as a processing unit that executes these processing steps by loading the mura evaluation program into the RAM 158 and by executing the loaded program by means of the CPU 160.

The mura evaluation method of this embodiment starts from step S200. Then, in step S201, the stage driving unit 118 is controlled so that the entire display area of the display device can be within the field of view of the camera 114, and thereby an entire image of the display area is captured. The outline of the display area of the display device captured in step S201 is stored in the RAM 158 as source data that is later used for generating a virtual plane which represents the physical range of the display area in a display space, and which is displayed with display mura superimposed thereon. Here, the virtual plane may be displayed in any display manner, as long as the virtual plane is generated corresponding to the display area. In step S202, mura defects in the display area are detected from the captured entire image by using feature values that characterize the mura defects, and a vertical-direction feature value of each of the detected mura defects, which is a feature value in the vertical direction, is calculated by using a compensation formula based on the feature value of the mura defect.

Note that, in this embodiment, a SEMU value described in Nakano and Mori, "Quantitative Approach of Sensory Evaluation By Using Machine Vision Technique" and Mori and Nakano, "Quantitative Evaluation Method of Liquid Crystal Displays' Mura (Luminance Nonuniformity) by Using Wavelet Transform" is used as one example of the feature value of a mura defect. In another embodiment, however, a feature value of a mura defect most suitable for a particular display device can be defined by using any appropriate one of or any appropriate combination of feature values in luminance change, hue change and tone change, and can be used for generating a three-dimensional mura figure, as long as the mura defect can be quantified appropriately.

In step S203, n mura defects to be evaluated are selected according to whether or not each mura defect has a vertical (or normal)-direction feature value exceeding a predetermined threshold. The predetermined threshold can be set for the vertical-direction feature value of a mura defect that is a feature value of the mura defect observed in a vertical direction perpendicular to the mura region. In another embodiment, a threshold can be set for a mura area. Thus, any type of parameter can be used as a threshold according to the tolerance of product quality standards of display devices.

In step S204, m mura images of each of the n mura defects are captured at m different angles. The mura defect in each of the images is quantified. Here, more detailed description will be provided using the embodiment shown in Fig.

By the stage driving unit 118, the center of the field of view of the camera 114 is aligned with the center of the mura defect 120 to be imaged. Then, by controlling the camera driving unit 116, the camera 114 is moved along the spherical surface relative to the mura defect 120 while keeping a distance L from the mura defect 120 constant, and thereby captures multiple images by changing the shooting angle θ. A relationship between the shooting angle θ and the elevation angle β is set as described above. The azimuth angle α is defined as an azimuth angle α of the camera 114 from the reference direction on the display area.

The range of the angle α can be set at 0° to 360°, and the range of the angle β can be set at 0° to +90°. The change amounts of the angles α and β per shooting can be set at approximately 30° and 10°, respectively. In the embodiment described herein, a single mura defect 120 is characterized by feature values in all the mura observation directions obtained by using image data of 104 images.

Here, the change amounts of the angles α and β can be set appropriately by reducing or increasing the number of sample points in consideration of the performance of the information processing apparatus 150, inspection efficiency and inspection accuracy. In addition, in this embodiment, it is preferable to set the angles α and β within ranges of $0° \leq α \leq 360°$ and $0° \leq β \leq +80°$, respectively, because the measurement of mura images captured around at the angle β=90° may fail to obtain sufficiently high S/N ratio, due to scattering from the display area, from the viewpoints of shape determination.

In step S205, a particular data point j for each of the n mura defects is generated as $j(α_j, β_j, s_j)$ by using the data point in every observation direction. Here, $s_j$ denotes an integrated value of feature values of the mura defect measured at the shooting position. Thereafter, in step S205, a three-dimensional mura figure curved plane corresponding to a set of data points $j(α_j, β_j, s_j)$ is calculated by applying a proper three dimensional interpolation function or three dimensional spline function to the data point $j(α_j, β_j, s_j)$. The three-dimensional mura figure curved plane is further extended by extrapolation to a position at the angle β=90°. More specifically, the three-dimensional mura figure curved plane extended over the display area and given by the following formula (1) is calculated using the set of data points $j(α_j, β_j, s_j)$ as three-dimensional mura figure data.

[Formula 1]

$$\text{MURA}(α_j, β_j) = \text{Coefficient} \times s(α_j, β_j) \times F(α_j, β_j) \quad (1)$$

In the above formula (1), MURA($α_j, β_j$) is an equation of a curved plane that constitutes a three-dimensional mura figure; $s(α_j, β_j)$ denotes the degree of angle dependency of a feature value of a mura defect; and $F(α_j, β_j)$ denotes a dimensionless term that defines a feature value of observation angle dependency of the mura defect; and Coefficient denotes a dimensionless weighting coefficient corresponding to the observation angle and given in accordance with specification setting of display devices. Therefore, MURA($α_j, β_j$) in the above formula (1) has the same number of dimensions as that of the feature value $s(α_j, β_j)$ of the mura defect. In the above formula, the function s and the function F can be given as any type of linear combination expressed by a two dimensional polynomial expression, two dimensional exponential function, multidimensional polynomial expression or multidimensional exponential function. For instance, if the observation angle is within a range of 0°≦β≦90°, the mura evaluation can be made corresponding to the specification setting by setting Coefficient=0 regardless of the obtaining of data points. In the above formula (1), F (α, β) is an angle dependent term of the mura defect. Note that, the above formula (1) is presented merely as an example, the variables α and β in the feature value terms (α, β) and the angle dependent term F (α, β) may be separated, and the azimuth angle α and the elevation angle β may be expressed by independent functions, individually.

Incidentally, in this embodiment, the three-dimensional mura figure curved plane may be registered in the RAM 158 in a form of an analytic function with the setting of a coefficient such as a multidimensional polynomial expression or exponential polynomial expression. Thereafter, the three-dimensional mura figure curved plane may be calculated on the fly in response to a request for processing, and thereby used. Instead, the three-dimensional mura figure data may be calculated in advance for all the points needed to calculate the integrated value of the feature values, and registered as the three-dimensional mura figure curved plane data in the RAM 158.

Figure 3:
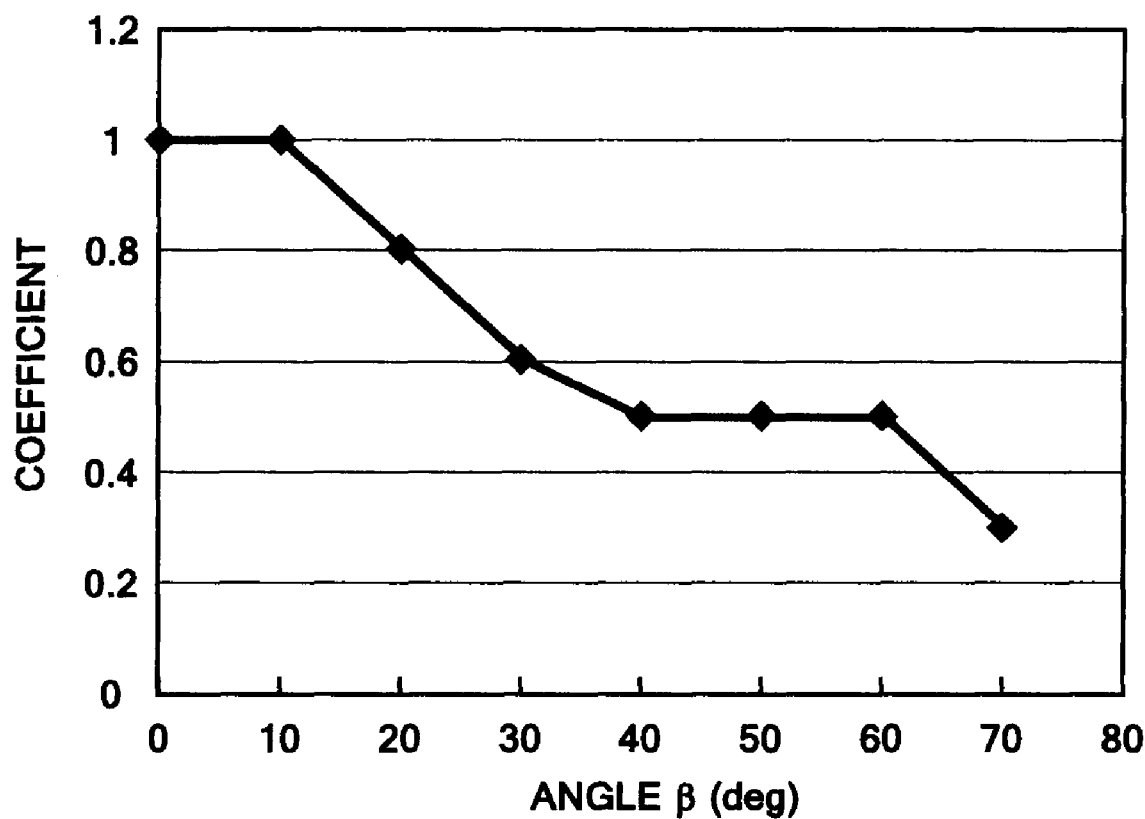
FIG. 3 is a graph, showing an example of distribution of Coefficient relative to angle, in which Coefficient values are plotted within a range of $\beta=0°$ to $90°$.

FIG. 3 shows an example of distribution of Coefficient in the above formula (1) relative to angle, i.e., a graph in which the value of Coefficient is plotted within a range of β=0° to 90°. As shown in FIG. 3, the value of Coefficient is set at 1 within a range of β=0° to 10° where the observation angle is the normal or nearly normal to a mura defect, and then is set at a smaller value as the observation angle becomes larger. Because users view display devices in the nearly normal direction in most cases, the influence of a mura defect is less weighted in the evaluation as the observation angle becomes larger. In the embodiment described herein, the weight for the mura evaluation is set to 0 within the angle range of the observation angle θ≧75° (angle β≦25° according to the specification setting of display devices, and therefore the value of Coefficient is set to 0. The value of Coefficient is not limited to the value shown in FIG. 3, but can be set appropriately according to application and specifications of display devices.

The three-dimensional mura figure given by the above formula (1) can be quantified as a mura conspicuity value by numerically integrating three-dimensional mura figure curved plane over the angle α and the angle β. The numerical integration method for calculating the mura conspicuity value IM can be any of known numerical integration methods.

In step S206, a virtual plane is generated by setting the display area of the display at (X, Y, Z=0) that is equivalent to the level of IM=0 indicating the absence of a mura defect. The virtual plane generated here represents the display area that extends in a proper direction in a (X, Y, Z) space. Then, the three-dimensional mura figure curved plane is superimposed on the virtual plane viewed from the observation angle, and thereby a mura superimposed image is displayed. The mura superimposed image thus generated is displayed on the display device 166 of the information processing apparatus 150, and is used by an operator to determine the size, distribution, angle dependency or the like of mura defects. A hardcopy can be made by printing out the mura superimposed image together with the mura conspicuity value IM at each data point. The mura evaluation method of this embodiment is terminated upon completion of the generation of the mura superimposed image and the calculation of the conspicuity value IM in step S206.

To be more precise, a mura superimposed image representing the three-dimensional mura figure expressed by MURA (α, β) when viewed from a certain observation angle in the (X, Y, Z) space is generated as follows. Firstly, the virtual plane representing the display area viewed from the observation angle is generated. Then, a shape of the three-dimensional mura figure viewed from the observation angle is calculated in the display space (X, Y, Z) so that, while viewing the display device in the normal direction, the operator can recognize the three-dimensional mura figure curved plane viewed from the observation angle. Lastly, the shape thus calculated is superimposed on the virtual plane. Here, the virtual plane is generated by using a shape of the display area of the display device, and by deforming the shape so that the shape can be identical to the shape of the display area viewed from the certain observation angle. Then, the three-dimensional mura figure is superimposed on the virtual plane shaped corresponding to the observation angle. In this embodiment, by forming an image of a mura defect in a display device as described above, mura evaluation even based on the image is made more like intuitive mura evaluation.

Figure 4:
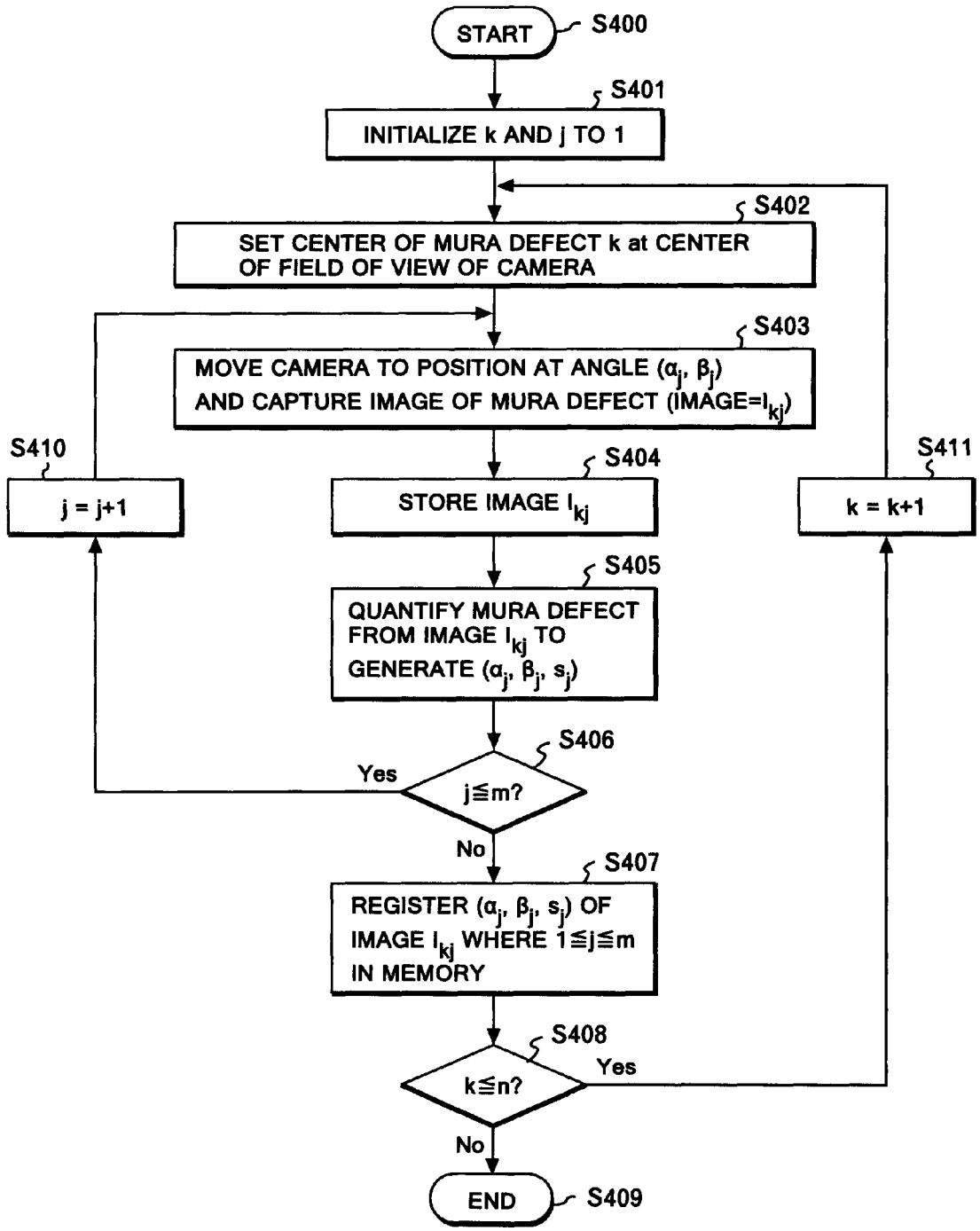
FIG. 4 is a flowchart of detailed processing in step S204 in FIG. 2.

FIG. 4 shows a flowchart of detailed processing in step S204 in FIG. 2. The processing in FIG. 4 takes over the processing from step S203 and starts from step S400. In step S400, an image counter k (positive integer), and a data point processing counter j (positive integer) are both initialized to 1. In step S402, the center of the field of view of the camera is set at the mura center of a mura defect numbered k. In step S403, the shooting position is moved to the position at the angle ($\alpha_j$, $\beta_j$) while the center of the field of view of the camera is fixed on the mura center of the target mura, and then a mura image is captured. The mura image thus captured is assigned an image identification value $I_{kj}$, and the image $I_{kj}$ is stored in step S404.

In step S405, the mura defect is quantified from the image $I_{kj}$, and the data point j ($\alpha_j$, $\beta_j$, $s_j$) is generated. In step S406, the image counter j is compared with a data point number m (non-negative integer), and thereby it is determined if j≦m holds. If j≦m (Yes), the image counter j is incremented from j to j+1 in step S410, and the processing returns to step S403. Then, the image capturing is further continued. On the other hand, if j>m (No), this means that the obtaining of m data points to be obtained is already completed. Thus, in step S407, the m data points j ($\alpha_j$, $\beta_j$, $s_j$) for the images $I_{kj}$ are registered in a memory and thereby are ready to be provided to the processing in step S205.

Thereafter, in step S408, it is determined if k≦n holds. If k≦n (Yes), this means that the evaluation of all the extracted mura defects is not completed. Thus, k is incremented from k to k+1 in step S411, and the processing retunes to step S402. in this way, the image capturing is iteratively performed until the images $I_{kj}$ are obtained for all the extracted mura defects, and finally the processing is terminated in step S409 when it is determined that K>n holds (No).

Figure 5A:
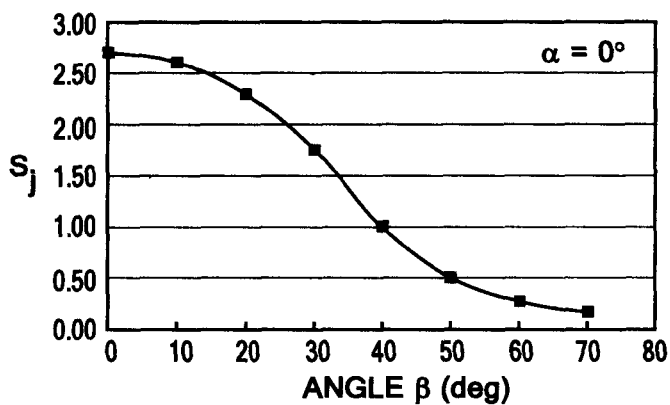
FIGS. 5A to 5D show examples of distribution of the feature value $s_j$ of a three-dimensional mura figure generated according to this embodiment, and are diagrams showing the angle $\beta$ dependencies of a mura defect when the mura defect is cross-sectioned at the angles $\alpha=0°$, $\alpha=90°$ and $\alpha=270°$, respectively, in the counterclockwise direction.
Figure 5B:
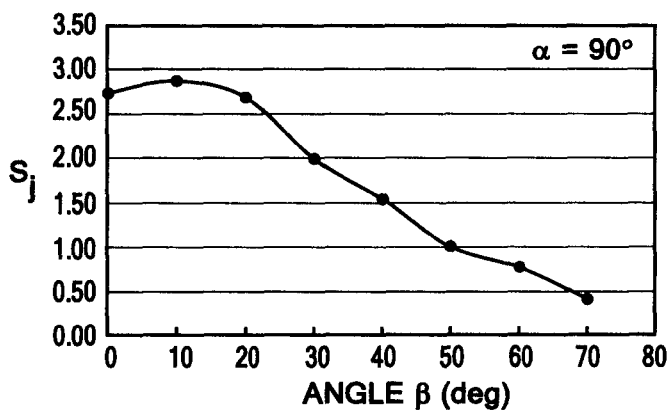
Figure 5C:
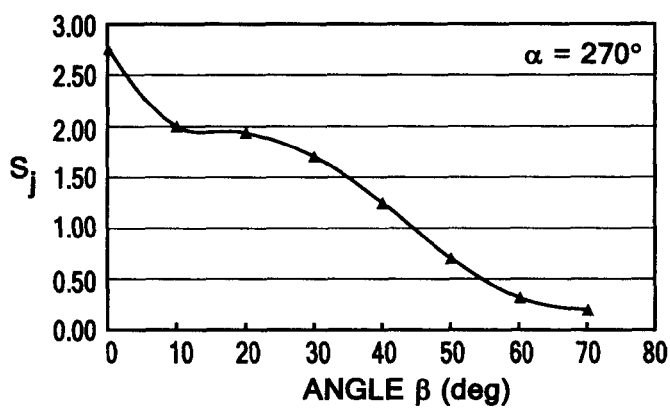
Figure 5D:
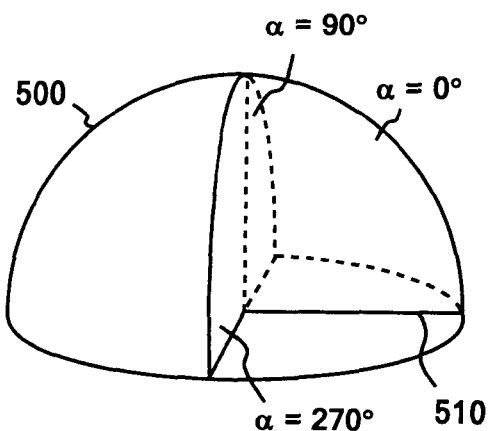

FIGS. 5A to 5D show examples of distribution of the feature value $s_j$ of the three-dimensional mura figure generated according to this embodiment. More specifically, FIGS. 5A, 5B and 5C are diagrams showing the angle β dependencies of a mura defect when the mura defect is cross-sectioned at the respective angles α=0°, α=90° and α=270° which are defined in the counterclockwise direction. FIGS. 5A, 5B and 5C show graphs in which the feature values $s_j$ obtained at the angles α=0°, α=90° and α=270°, respectively, are plotted with respect to the angle β within a range of 0° to 75°. FIG. 5D shows the definitions of these angles in this embodiment. As shown in FIG. 5D, the angle α is defined as α=0° at a position indicated by a line 510 of a three-dimensional mura FIG. 500, and as incrementing counterclockwise. As shown in FIGS.

5A to 5C, the illustrated feature value $s_j$ of a mura defect is generally large when the mura defect is viewed in the normal direction. Moreover, as for a change in the mura defect depending on a direction, the angle β dependency of the mura defect is different depending on the angle α as shown in FIGS. 5A to 5C, and therefore the mura defect is anisotropic.

Figures 6A, 6B:
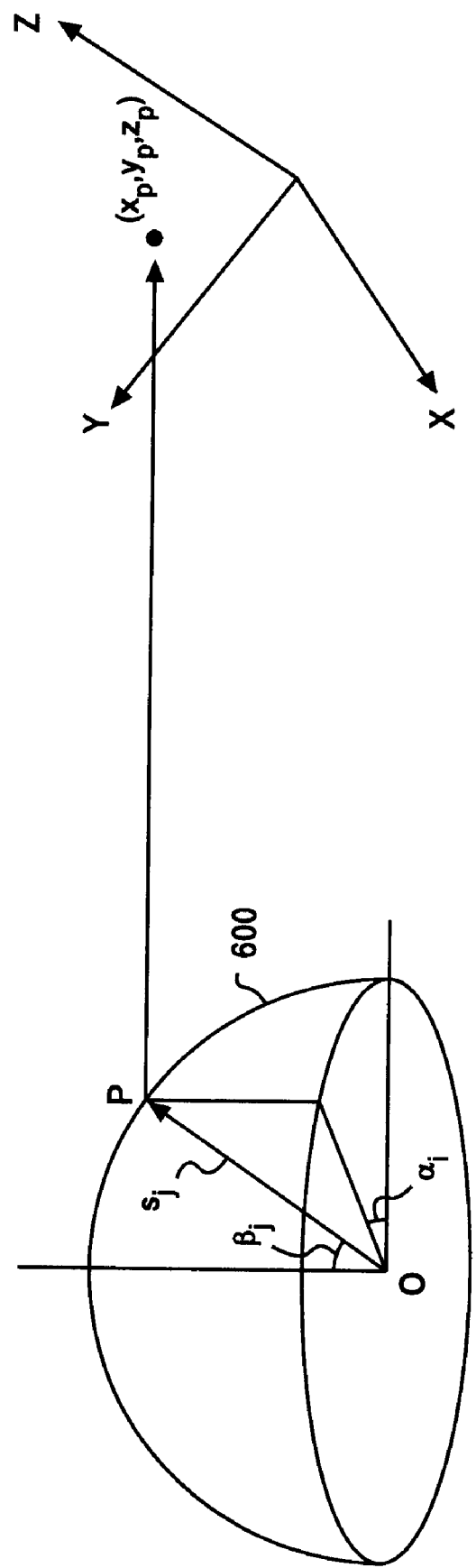
FIGS. 6A and 6B shows a three-dimensional mura figure generated according to this embodiment, and an example of coordinate conversion to generate a mura superimposed image from the three-dimensional mura figure.

FIGS. 6A and 6B show an example of coordinate conversion of a three-dimensional mura figure curved plane generated according to this embodiment from an angle coordinate representation to the Cartesian coordinate system. Such coordinate conversion is performed to generate a planar image from the three-dimensional mura figure. FIG. 6A shows the three-dimensional mura figure data of the angle coordinate representation, and FIG. 6B shows an example of correspondence between the observation spatial coordinate system ($\alpha_j$, $\beta_j$, $s_j$) and the Cartesian coordinate system of the planar image resulting from the conversion into the Cartesian coordinate system. In the first place, a three dimensional mura FIG. 600 is generated as either of the following curved planes by use of the data point $j(\alpha_j, \beta_j, s_j)$. One of the curved planes is a spline curved plane smoothly connecting the feature values $s_j$ of the mura defect at the angles $\alpha_j$ and $\beta_j$ where $s_j=\mathrm{mura}(\alpha_j, \beta_j)$. The other curved plane is a minimal residual curved plane given by fitting the functions $s(\alpha, \beta)$ and $F(\alpha, \beta)$ so as to minimize a residual (RESIDUAL) given by the following formula (2) using the above formula (1):

[Formula 2]

$$RESIDUAL = \sum_j ((MURA(\alpha_j, \beta_j)^2 - mura(\alpha_j, \beta_j)^2))^{1/2} \quad (2)$$

To be more specific, in the case of the minimal residual curved plane, the function $MURA(\alpha_j, \beta_j)$ of the three-dimensional mura figure curved plane is determined so as to give MIN (RESIDUAL). Here, when the coordinates of a certain surface point of the three-dimensional mura FIG. 600 are expressed by P ($\alpha p$, $\beta p$, $sp$), the surface point P is converted into three-dimensional mura figure data expressed by the Cartesian coordinate system in a display space generated for display by the information processing apparatus 150. The conversion of the surface point P is performed by using the mura center coordinates O (Ox, Oy) with the following formula (3):

[Formula 3]

$$x_p = O_x + s_p \times \sin \beta_p \times \cos \alpha_p$$

$$y_p = O_y + s_p \times \sin \beta_p \times \sin \alpha_p$$

$$z_p = s_p \times \cos \beta_p \quad (3)$$

In the above formula (3), the mura center coordinates O is associated with a plane position on the display area which is previously obtained, and $\alpha p$ and $\beta p$ are the azimuth angle and the elevation angle of the surface point P, respectively. In the above formula (3), the X, Y, Z coordinates are described as roughly having a relationship shown in FIG. 6B. Here, in the example shown in FIG. 6B, the display area is displayed as existing on a (X, Y) plane.

In a more preferable embodiment, the Cartesian coordinates given by the above formula (3) in this embodiment are generated as follows. Firstly, a deformed virtual plane is generated under the setting that the observation angle with respect to the display area of the display device is the normal vector of the virtual plane. Thereafter, the three-dimensional mura figure curved plane is calculated by performing the coordinate conversion such that the set observation direction can be located in a position where the observation direction is viewed when the display device for displaying the mura superimposed image is viewed in the normal direction. In this way, the three-dimensional mura figure 600 for each mura defect is generated.

Instead, in another more preferable embodiment of this embodiment, when a mura defect has a contrast-strongest region occupying a certain proportion of the mura defect or more, the region is superimposed on the three-dimensional mura figure curved plane while being displayed with a shape obtained by projecting the region onto an intersecting plane of the virtual plane and the three-dimensional mura figure placed on the virtual plane. Incidentally, the graphics processing for displaying the mura superimposed image can be set appropriately according to a particular need unless the setting impairs intuitive recognition of the three-dimensional mura figure.

Figure 7:
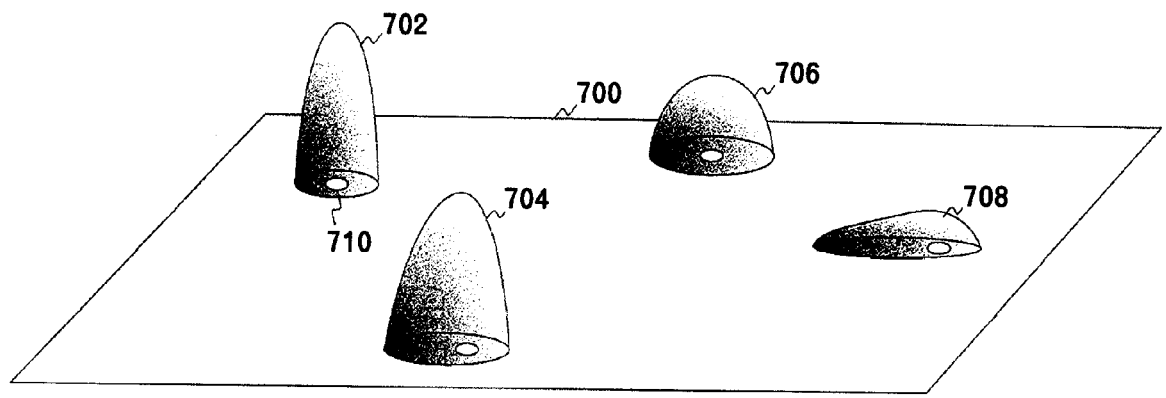
FIG. 7 is a diagram showing an example of a plane image showing mura defects according to this embodiment.

FIG. 7 shows an example of a mura superimposed image showing mura defects according to this embodiment. A virtual plane 700 representing the display area shows extracted mura defects 702 to 708. Each of the mura defects 702 to 708 includes a portion 710 at the same level as the display area. The portion 710 represents a certain display region having the high feature values $s_j$ in the mura defect, and is displayed as a portion different in hue, luminance and the like from the other portion in the mura superimposed image. The portion 710 is displayed in a position where the virtual plane and the three dimensional mura figure intersect with each other, i.e., a position in the surface of the virtual plane that represents the surface of the display area. This display enables quantitative and intuitive determination as to how anisotropic a mura defect is, and is also usable to identify a factor of generating the mura defect.

In this embodiment, as shown in FIG. 7, the three-dimensional mura figure is generated by being superimposed on the virtual plane 700 of the display device. As a result, the feature values obtained when a mura defect is evaluated in the sensory test can be displayed in graphics. This allows more quantitative mura evaluation than in the sensory test.

Moreover, in the mura image shown in FIG. 7, the conspicuity value IM can be numerically displayed, as the volume of the three-dimensional mura figure, in association with the three-dimensional mura figure. With this display, it is possible to determine the mura overall feature value that is an integrated value of the feature values of the peak and range of the mura defect, and thereby to perform mura evaluation with higher accuracy than the sensory test.

Figure 8A:
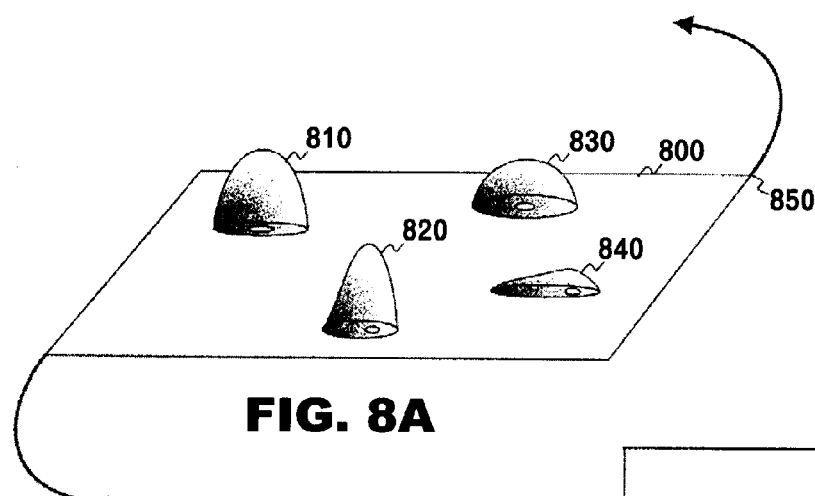
FIGS. 8A and 8B show another example of displaying three-dimensional mura figures detected in this embodiment.
Figure 8B:
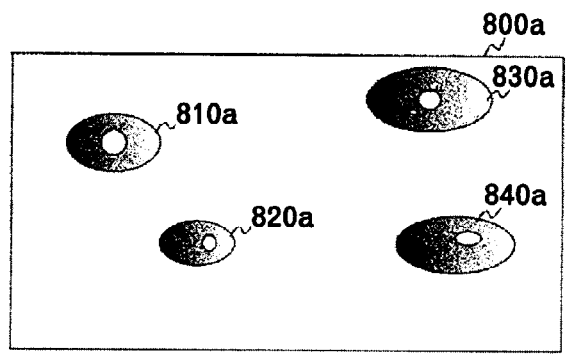

FIGS. 8A and 8B show another example of displaying the three-dimensional mura figures detected according to this embodiment. In the example shown in FIGS. 8A and 8B, the mura superimposed image including the three-dimensional mura figures is rotated and thus displayed in response to an instruction from the operator. In FIGS. 8A and 8B, a handle is set at a corner point 850, for example, in a virtual plane 800. When the operator operates a mouse while placing its mouse cursor on the corner point 850, the virtual plane is deformed by turning round about a rotation center set as needed. Thus, the mura superimposed image shown in FIG. 8A is transformed into the mura superimposed image in FIG. 8B along with a correction of the observation angle in view.

FIG. 8B shows the virtual plane 800a viewed right above the display area (that is, from the position of the camera 114 shown in FIG. 1) after the observation angle is changed from that shown in FIG. 8A. In addition, the three-dimensional mura FIGS. 810a to 840a are superimposed after converting the position coordinates (X, Y, Z) of the three-dimensional mura figures into such coordinates that the three-dimensional mura figures are viewed when the display device of the information processing apparatus 150 is viewed in the normal direction. Also, in FIG. 8B, a portion having a high mura feature value in each mura defect is displayed with different hue, luminance and the like, and thus the most serious portion and the planer range of the mura defect can be evaluated.

Figure 9:
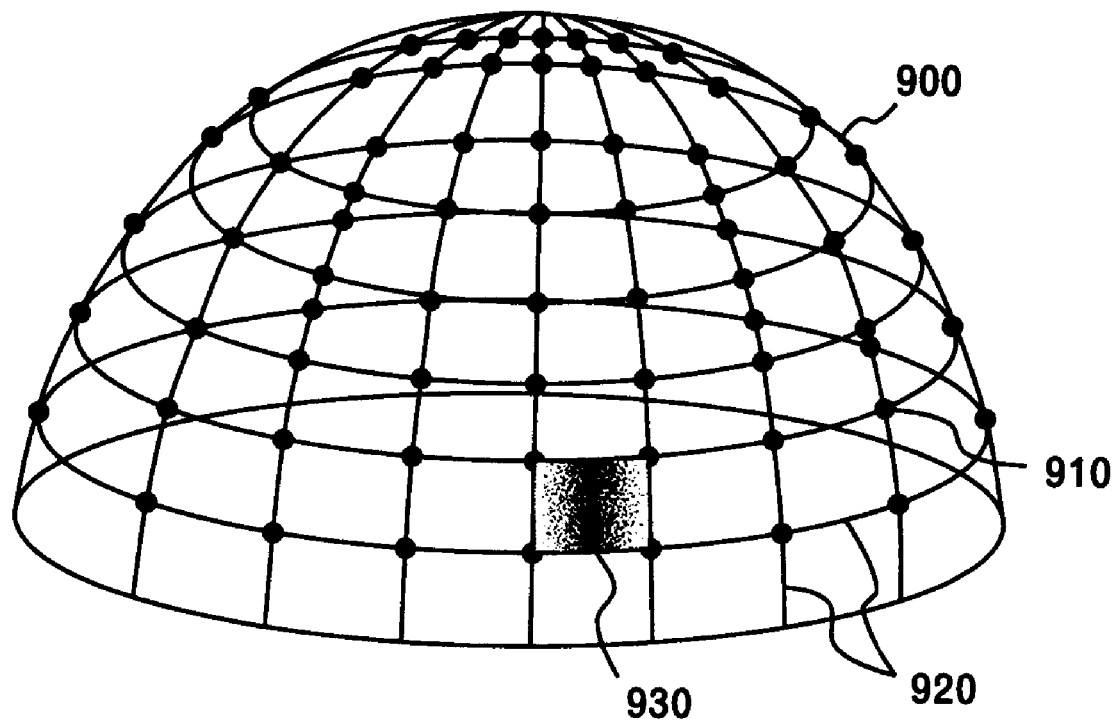
FIG. 9 is a diagram showing another display example of the three-dimensional mura figures of this embodiment.
Figure 10:
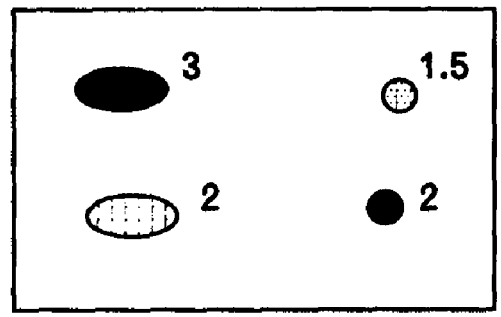
FIG. 10 is a diagram showing mura images generated by a conventional mura evaluation method.
Figure 10:
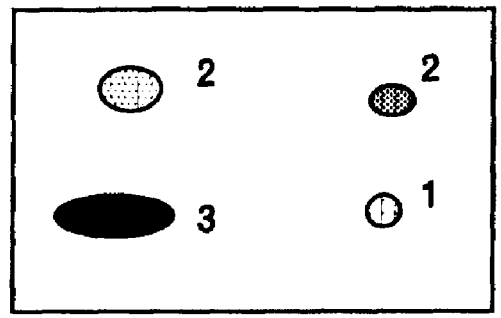

FIG. 9 shows another display example of the three-dimensional mura figures of this embodiment. In the example shown in FIG. 9, a data point $j(\alpha_j, \beta_j, s_j)$ 910 is displayed as a black circle "•" in order to display a three-dimensional mura FIG. 900. The black circles "•" are displayed on positions on a plane corresponding to the data points 910 at which the images are captured. In addition, increment levels for image capturing are shown by lines 920, and accordingly the three-dimensional mura figure can be recognized without having any spline curved plane displayed. In the display example shown in FIG. 9, spline curved planes or minimal residual curved planes 930 may also be arranged to display the three-dimensional mura figure.

As described above, according to this embodiment, there can be provided a mura evaluation apparatus, a mura evaluation method, and a display inspection apparatus and program which enables a mura defects present in the display area of a flat display device to be quantitatively and intuitively evaluated, even in terms of its angle dependency, and is capable of obtaining an evaluation result equivalent to that of a sensory test.

The aforementioned function of this embodiment can be implemented as a device-executable program written in a legacy programming language such as C, C++, Java (registered trademark), Java (registered trademark) Applet, Java (registered trademark) Script, Perl, Ruby, or PYTHON, or an object oriented programming language. The program can be stored in any device-readable recording medium such as a hard disk device, a CD-ROM, an MO, a flexible disk, an EEPROM, or an EPROM and thus be distributed, or instead, can be transmitted through a network in any format supported by other devices.

Although the embodiments have been described above, the present invention is not limited to the embodiments described above, but can be changed within a range in which those skilled in the art can come up with by implementing another embodiment, or by adding any element to the present invention, or changing or omitting any element of the present invention. Any modes thus made should be included within the scope of the present invention, as long as these modes provide the same operations and advantageous effects as those of the present invention.

What is claimed is:

1. A non-uniformity evaluation apparatus for evaluating a display non-uniformity (also called "mura" below) of a display device, comprising:
   a non-uniformity detection unit that acquires a plurality of images of a display mura present in a display area of the display device by scanning the display area while moving along a spherical surface with a preset radius; and
   an information processing apparatus that generates a three-dimensional mura figure from the plurality of images acquired by the non-uniformity detection unit, by associating a feature value of the display mura in each of the images with a position where the image is acquired, and displays the three-dimensional mura figure superimposed on a virtual plane representing the display area so that the three-dimensional mura figure can be viewed from a designated observation angle,
   wherein the information processing apparatus further comprises:
   a memory device that obtains an elevation angle and an azimuth angle as the position, and stores two kinds of three-dimensional mura figure data, one of which is three-dimensional mura figure data specified by a feature value of the display mura at each of the positions, and the other of which is three-dimensional mura figure data having coordinates converted into a Cartesian coordinate system from those in the former three-dimensional mura figure data,
   a controlling device that calculates the three-dimensional mura figure viewed when the virtual plane is viewed from the observation angle, and generates a mura superimposed image in which the three-dimensional mura figure is superimposed on the virtual plane, and
   a control I/O unit section that outputs the three-dimensional mura figure superimposed on the virtual plane.

2. The non-uniformity evaluation apparatus according to claim 1, wherein the non-uniformity detection unit includes:
   a camera that acquires the images;
   a camera driving unit that moves the camera to such positions that the images of the display mura can be captured; and
   a stage driving unit that positions the display mura, targeted for the image capturing, within a field of view of the camera.

3. The non-uniformity evaluation apparatus according to claim 2, wherein
   the controlling device generates the three-dimensional mura figure as a three-dimensional mura figure curved plane which smoothly connects the three-dimensional mura figure data or gives a minimal residual.

4. The non-uniformity evaluation apparatus according to claim 3, wherein
   the controlling device defines a handle for rotating the virtual plane, and
   the controlling device rotates the virtual plane in response to an operation preformed on the handle, recalculates the three-dimensional mura figure curved plane according to the rotation, and then updates the mura superimposed image by superimposing the recalculated three-dimensional mura figure curved plane on the virtual plane.

5. A non-uniformity evaluation method for evaluating a display mura of a display device, the non-uniformity evaluation method comprising the steps of:
   capturing an image of a display area of the display device set within a field of view of a camera;
   extracting display muras from the image of the display area thus captured, the display mura targeted for three-dimensional mura figure data generation;
   capturing images of each of the display muras at different elevation angles and azimuth angles with respect to the camera, generating three-dimensional mura figure data by calculating a feature value of the display mura at each pair of an observation angle and the azimuth angle, and generating a three-dimensional mura figure curved plane from the three-dimensional mura figure data; and
   calculating the three-dimensional mura figure curved plane viewed when the display area is viewed from the observation angle, and displaying a mura superimposed image in which the three-dimensional mura figure curved plane is superimposed on a virtual plane that represents the display area.

6. The non-uniformity evaluation method according to claim 5, wherein the step of displaying further includes the steps of:
defining a handle for rotating the virtual plane, and
rotating the virtual plane in response to an operation performed on the handle, and updating the mura superimposed image by recalculating the three-dimensional mura figure curved plane according to the rotation.

7. The non-uniformity evaluation method according to claim 6, wherein the step of displaying further includes the step of displaying a region having a feature value equal to or higher than a threshold set for the display mura, the region being superimposed, as a portion different in hue or luminance, on the three-dimensional mura figure curved plane at a position in a bottom surface of the three-dimensional mura figure.

8. The non-uniformity evaluation method according to claim 7, wherein the step of generating the three-dimensional mura figure curved plane includes the step of generating the three-dimensional mura figure as a three-dimensional mura figure curved plane which smoothly connects the three-dimensional mura figure data or gives a minimal residual.

9. A display inspection apparatus for evaluating a display mura of a display device, comprising:
a non-uniformity detection unit that acquires a plurality of images of a display mura present in a display area of the display device by scanning the display area while moving along a spherical surface with a preset radius; and
an information processing apparatus that generates a three-dimensional mura figure from the plurality of images acquired by the non-uniformity detection unit, by associating a feature value of the display mura in each of the images with a position where the image is acquired, and causes a mura superimposed image to be displayed such that the three-dimensional mura figure viewed from a designated observation angle can be superimposed on a virtual plane viewed from the designated observation angle, wherein
the information processing apparatus includes:
a memory device that obtains an elevation angle and an azimuth angle as the position, and stores two kinds of three-dimensional mura figure data one of which is three-dimensional mura figure data specified by a feature value of the display mura at each of the positions, and the other of which is three-dimensional mura figure data having coordinates converted into a Cartesian coordinate system from those in the former three-dimensional mura figure data;
a controlling device that calculates the three-dimensional mura figure viewed when the virtual plane is viewed from the observation angle, and generates the mura superimposed image in which the three-dimensional mura figure is superimposed on the virtual plane; and
a control I/O unit section that outputs the three-dimensional mura figure superimposed on the virtual plane, and
the non-uniformity detection unit includes:
a camera that acquires the images;
a camera driving unit that moves the camera to such positions that the images of the display mura can be captured; and
a stage driving unit that positions the display mura, targeted for the image capturing, within a field of view of the camera.

10. The display inspection apparatus according to claim 9, wherein
the controlling device generates the three-dimensional mura figure as a three-dimensional mura figure curved plane which smoothly connects the three-dimensional mura figure data or gives a minimal residual.

11. A device-executable program, tangibly embodied in a non-transitory computer readable medium, for a non-uniformity evaluation apparatus to execute a non-uniformity evaluation method for evaluating a display mura of a display device, the program causing the non-uniformity evaluation apparatus to execute the steps of:
capturing an image of a display area of the display device set within a field of view of a camera;
extracting display muras from the image of the display area thus captured, the display mura targeted for three-dimensional mura figure data generation;
capturing images of each of the display muras at different elevation angles and azimuth angles with respect to the camera, generating three-dimensional mura figure data by calculating a feature value of the display mura at each pair of an observation angle and the azimuth angle, and generating a three-dimensional mura figure curved plane from the three-dimensional mura figure data; and
calculating the three-dimensional mura figure curved plane viewed when the display area is viewed from the observation angle, and displaying a mura superimposed image in which the three-dimensional mura figure curved plane is superimposed on a virtual plane that represents the display area, the step of displaying a mura superimposed image further including the steps of:
superimposing a region having a feature value equal to or higher than a threshold set for the display mura, as a portion different in hue or luminance, on the three-dimensional mura figure curved plane at a position in a bottom surface of the three-dimensional mura figure;
defining a handle for rotating the virtual plane; and
rotating the virtual plane in response to an operation performed on the handle, and updating the mura superimposed image by recalculating the three-dimensional mura figure curved plane viewed when the display area is viewed from the observation angle according to the rotation.

* * * * *